Patented Jan. 6, 1942

2,268,754

UNITED STATES PATENT OFFICE 2,268,754

DERIVATIVES OF 4,4'-DIAMINODIPHENYL SULPHONE

Morris S. Kharasch and Otto Reinmuth, Chicago, Ill., assignors to Eli Lilly and Company, Indianapolis, Ind., a corporation of Indiana No Drawing. Application October 10, 1940, Serial No. 360,624

12 Claims. (Cl. 260—397.6)

Our invention relates to certain new derivatives of 4,4'-diaminodiphenyl sulphone, and to the process of producing them.

These new products are of low toxicity, and are efficacious on oral as well as on parenteral (including intravenous) administration for the treatment both of streptococcal and of pneumococcal infections, especially those of great virulence.

These new products are carboxylic acids (and their water-soluble salts) in which a carboxylic group is indirectly attached to one or to each of the two nitrogen atoms of 4,4'-diaminodiphenyl sulphone by substituting for a hydrogen atom of one or of each of the two amino groups of the 4,4'-diaminodiphenyl sulphone a carboxylic acyl group having the general formula (1)         —CO—R—COO—X in which R represents a member of the general class of divalent hydrocarbon and substituted-hydrocarbon groups, such as the ethylene group (—CH$_2$—CH$_2$—), the etheylene group (—CH=CH—), and the ortho-phenylene group (—C$_6$H$_4$—), and X represents a member of the general class of positive ions, such as hydrogen, the alkali metals, the alkaline-earth metals (with the rest of formula 1 doubled to satisfy valences), and the nitrogen hydro-onium ions derived from ammonia, from the alkylamines, from the alkanolamines, and from the polymethylenediamines, including ethylenediamine. These carboxylic acids thus have in general one or the other of the following formulas, according to whether the substitution is on one or both amino groups:

(2) 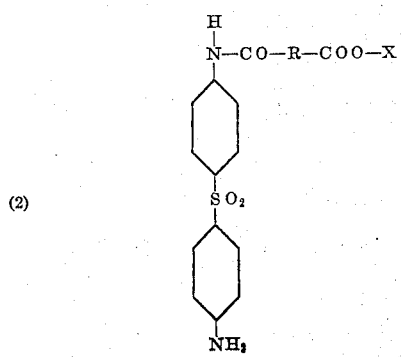

or (3) 

in which R and X have the same meaning as before.

The salts (that is, where X is other than hydrogen), are all freely soluble in water; and in general very slightly soluble in absolute alcohol, and insoluble in ether and in benzene. The acids (that is, when X is hydrogen), are in general insoluble or nearly insoluble in water.

In preparing our new products, we may in general proceed as follows:

To a warm solution of 4,4'-diaminodiphenyl sulphone in a suitable solvent, such for example as dioxane or pyridine or glycol dimethyl ether, we add an inner acid anhydride of a dicarboxylic acid, having the general formula:

(4) 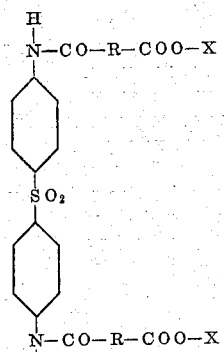

in which R has the same meaning as before. The amount added of this inner acid anhydride depends on whether a monosubstituted or a disubstituted derivative of the 4,4'-diaminodiphenyl sulphone is desired. If a monosubstituted derivative is desired, we desirably add only one molecular equivalent of the acid anhydride, or desirably rather less than one, suitably about one-half; while if a disubstituted derivative is desired, we desirably add two molecular equivalents, or more, of the acid anhydride. If we add between one and two molecular proportions of the anhydride we get a final product which is a mixture of the mono- and disubstituted derivatives, which mixture is therapeutically effective although less desirable than the individual ingredients. In the main we get the individual compounds by keeping the amount of the anhydride either not less than two or not more than one molecular proportion.

In producing the disubstituted derivatives in dioxane as the solvent, simple chilling of the reaction solution is ordinarily sufficient to cause a satisfactory yield, by precipitation, of the desired reaction product in solid form, which may then be suitably separated, as by filtration or decantation. In producing the monosubstituted derivatives, however, it is generally preferable and sometimes necessary first to remove the solvent, as by evaporation at low temperature and pressure, and then to extract the desired reaction product in the form of an aqueous solution of its sodium salt from the solid or gummy residue by leaching with an aqueous sodium-carbonate solution. By acidifying the aqueous solution thus produced with a strong acid, suitably hydrochloric acid or sulphuric acid, and cooling when and if necessary, the desired monosubstituted derivative is obtained in acid form as a precipitate; which may be suitably recovered, as by filtration or decantation. The excess of 4,4'-diaminodiphenyl sulphone remaining in solid form after the leaching may be suitably recovered and purified in known manner.

The mono- and disubstituted acids thus obtained are represented by formulas 2 and 3 above, with X signifying hydrogen.

Salts of these acids may be obtained by dissolving the acids in the minimum amount of a suitable solvent, suitably absolute alcohol or glycol or glycol ethers, in which the acid is soluble but its salts are relatively insoluble, and adding the desired base, dissolved in the same solvent if desired or necessary. The base may be, for example, sodium or potassium hydroxide, sodium or potassium ethoxide, calcium ethoxide in alcohol, ammonia, an alkyl-or alkanolamine, or a polymethylene diamine, such as ethylenediamine. The desired salt, formed on such addition, is precipitated in solid form because of its relative insolubility in the solvent used.

The following are examples of our process.

*Example 1.*—The disubstituted succinic-acid derivative is produced as follows: To 2.5 grams (0.01 mole) of 4,4'-diaminodiphenyl sulphone dissolved in 15 milliliters of hot (about 100° C.) dioxane are added, with stirring, 2.0 grams (0.02 mole) of finely powdered succinic anhydride. The solution is maintained at a temperature slightly below the boiling point for about 15 minutes, and then cooled. On such cooling, the reaction product precipitates in the form of white crystals, which are suitably collected, as by suction filtration, washed with small portions of a suitable liquid, such as cold dioxane, and suitably dried, conveniently over phosphorus pentoxide in a vacuum desiccator. The dried product melts, with decomposition, at about 131° C., uncorrected. This product is 4,4'-bis-(β-carboxy-propionylamino)-phenylsulphonylbenzene, is insoluble in water, and has the following formula:

(5) 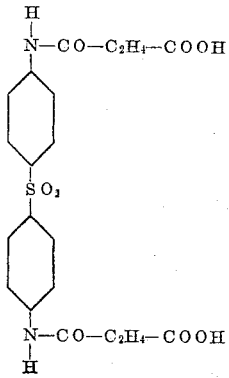

The water-insoluble product thus obtained is useful for oral administration in this acid form, but for parenteral administration it is more desirable in the water-soluble salt form. To obtain that, say of the sodium salt, the acid is dissolved in a minimum amount of absolute alcohol, and an alcoholic solution of sodium hydroxide is added in sufficient amount to make the whole strongly alkaline to litmus. A white precipitate of the sodium salt of 4,4'-bis-(β-carboxypropionylamino) phenylsulphonyl - benzene separates, is collected on a filter, washed with absolute alcohol to remove any unreacted sodium hydroxide or ethoxide that may be adsorbed, and dried, conveniently in a vacuum desiccator over phosphorus pentoxide. The salt thus obtained is very soluble in water, and is insoluble in absolute alcohol, ether, chloroform, carbon tetrachloride, and other non-polar solvents. It has the following formula:

(6) 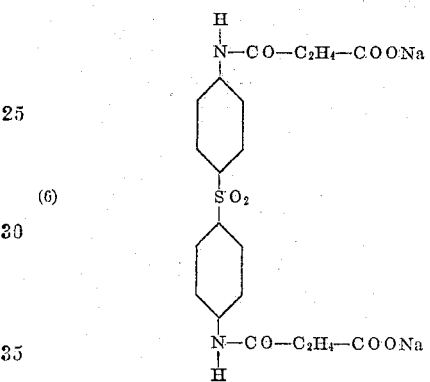

This sodium salt is found to be efficacious in the treatment of streptococcal and pneumococcal infections, and to be of low toxicity in comparison with 4,4'-diaminodiphenyl sulphone.

Other salts than the sodium salt may be obtained in generally similar manner, such as the potassium, calcium, ammonium, alkylamine (such as methyl- or ethylamine), alkanolamine (such as monoethanolamine), and polymethylene diamine (such as ethylenediamine) salts; and are also therapeutically effective.

*Example 2.*—The monosubstituted succinic-acid derivative is produced as follows: A solution of 1.0 gram (0.01 mole) of succinic anhydride in 10 milliliters of warm dioxane is added slowly to a solution of 5.0 grams (0.02 mole) of 4,4'-diaminodiphenyl sulphone in 30 milliliters of hot dioxane. The whole is maintained at or near its boiling point for about 15 minutes, and is then evaporated to dryness, conveniently at waterbath temperature under reduced pressure. The residue, which contains a great deal of unchanged 4,4'-diaminodiphenyl sulphone, is then purified. To this end it is extracted with an aqueous solution of sodium carbonate, and the insoluble residue is separated and collected on a filter for recovery of the 4,4'-diaminodiphenyl sulphone. The alkaline filtrate is acidified, as with hydrochloric or sulphuric acid; whereupon the desired product, in acid form, separates as an amorphous, flocculent precipitate. This is collected on a filter, washed with water, and dried, conveniently in a vacuum desiccator over phosphorus pentoxide. The product thus obtained may be further purified by dissolving it in absolute alcohol, in which it is very soluble, and boiling with charcoal to remove any coloring material. The alcohol is then removed in vacuo, the residue is dissolved in a minimum amount of an aqueous solution of sodium carbonate, to produce a water solution of the sodium salt. The purification may be effected by boiling this water solution of the sodium salt with charcoal, instead of boiling the aforesaid alcohol solution with charcoal. The water solution is acidified, as with hydrochloric or sulphuric acid, whereupon a cream-colored, semi-crystalline precipitate of the desired product in acid form appears, and is suitably collected, as on a filter. This product is 4-amino-4'-(β-carboxypropionylamino)phenylsulphonylbenzene, which melts at about 130–132° C., uncorrected. It has the following formula:

(7) 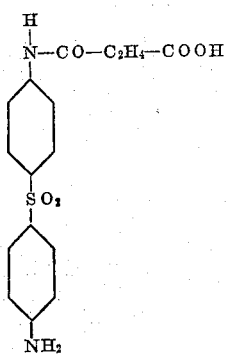

Analysis of a sample showed 8.37% of nitrogen, as compared with the calculated value of 8.05%.

This water-insoluble acid form of this monosubstituted derivative may be converted to the water-soluble salt form in the same manner as described for the disubstituted derivative in Example 1. If sodium hydroxide is used for such conversion, the sodium salt of 4-amino-4'-(β-carboxypropionylamino)phenylsulphonylbenzene is formed. It has the following formula:

(8) 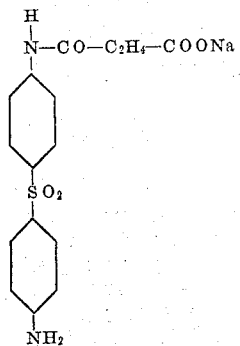

This sodium salt, as well both as other salts and as the free acid of Formula 7, is effective, both orally and parenterally, against experimental pneumococcal infections and against virulent streptococcal infections in mice. We have found that the monosuccinyl derivatives of Example 2 are more effective than are the disuccinyl derivatives of Example 1.

*Example 3.*—Maleic-acid derivatives, both disubstituted and monosubstituted, may be produced by the procedures outlined in Examples 1 and 2, by using equivalent quantities of maleic anhydride instead of the succinic anhydride of those examples. The products so obtained are 4,4'-bis-(β-carboxypropenoylamino)phenylsulphonylbenzene and 4-amino-4'-(β-carboxypropenoylamino)phenylsulphonylbenzene, and their salts. The sodium salts of the disubstituted and the monosubstituted derivatives respectively have the following formulas:

(9) 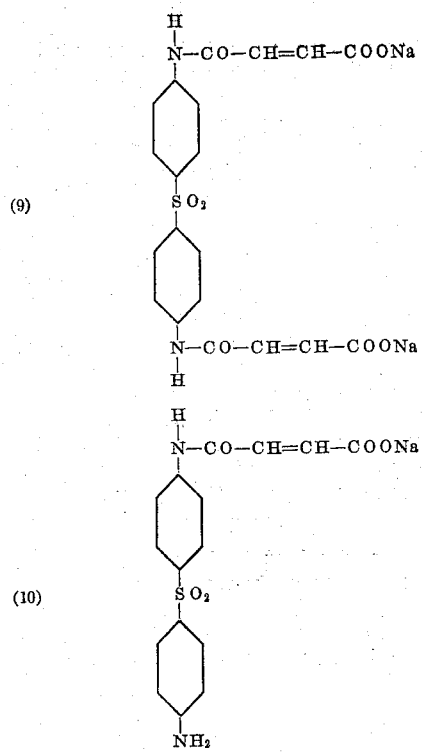

(10)

*Example 4.*—Phthalic-acid derivatives, both disubstituted and monosubstituted, may also be produced by the procedures outlined in Examples 1 and 2, by using equivalent quantities of phthalic anhydride instead of the succinic anhydride of those two examples or the maleic anhydride of Example 3. The products so obtained are 4,4'-bis-(o-carboxybenzoylamino)phenylsulphonylbenzene and 4-amino-4'-(o-carboxybenzoylamino)phenylsulphonylbenzene, and their salts. The sodium salts, of the disubstituted and the monosubstituted derivatives, have the following formulas:

(11) 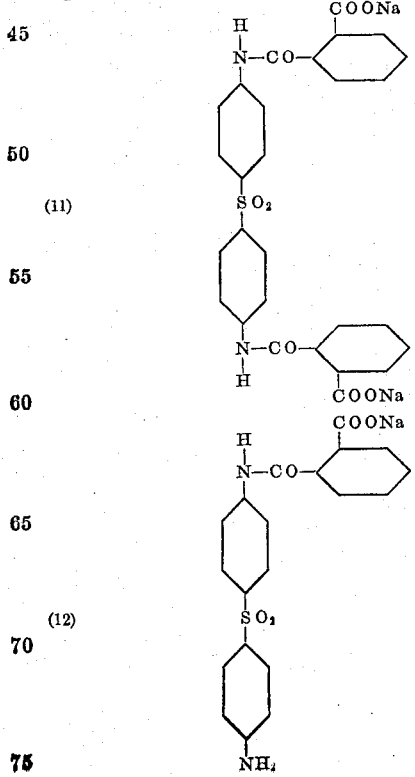

(12)

*Example 5.*—In similar manner it is possible to get various other derivatives, both monosubstituted and disubstituted, having the general formulas 2 and 3, by using appropriate amounts of the inner acid anhydrides corresponding to the desired substituent groups. For instance, by using glutaric anhydride, citraconic anhydride, itaconic anhydride, monochloromaleic anhydride, dichloromaleic anhydride, or hexahydrophthalic anhydride, there are obtained disubstituted or the monosubstituted (depending on the quantity used of the anhydride) glutonic, citraconic, itaconic, monochloromaleic, dichloromaleic, or hexahydrophthalic derivatives of 4,4'-diaminodiphenyl sulphone.

We claim as our invention:

1. Those derivatives of 4,4'-diaminodiphenyl sulphone in which a hydrogen atom of at least one of the two amino groups is replaced by a carboxylic acyl having the general formula:

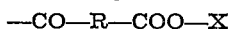

in which R is a divalent hydrocarbon radical having more than one carbon atom, and X is a positive ion.

2. Those monosubstituted derivatives of 4,4'-diamino-diphenyl sulphone which are represented by the following formula:

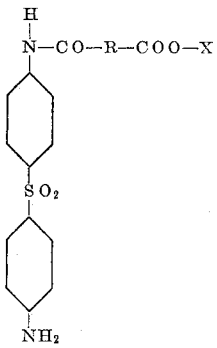

in which R is a divalent hydrocarbon radical having more than one carbon atom, and X is a positive ion.

3. Those disubstituted derivatives of 4,4'-diamino-diphenyl sulphone which are represented by the following formula:

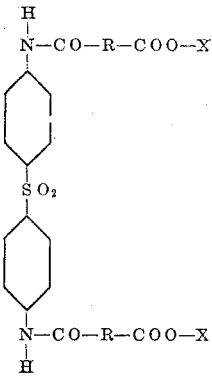

in which R is a divalent hydrocarbon radical having more than one carbon atom, and X is a positive ion.

4. A composition selected from the class consisting of 4-amino-4'-($\beta$-carboxypropionylamino)-phenylsulphonylbenzene and its water-soluble salts.

5. A composition selected from the class consisting of 4-amino-4'-($\beta$-carboxypropenoylamino)-phenylsulphonylbenzene and its water-soluble salts.

6. A composition selected from the class consisting of 4,4' - bis - (o - carboxybenzoylamino)-phenylsulphonylbenzene and its water-soluble salts.

7. The process of preparing the compounds of claim 1, which consists in reacting 4,4'-diaminodiphenyl sulphone with an inner anhydride of a dicarboxylic acid, which is represented by the formula:

in which R is a divalent hydrocarbon radical having more than one carbon atom.

8. The process of preparing the compounds of claim 2, which consists in reacting 4,4'-diaminodiphenyl sulphone with not to exceed one molecular proportion of an inner anhydride of a dicarboxylic acid, which is represented by the formula:

in which R is a divalent hydrocarbon radical having more than one carbon atom.

9. The process of preparing the compounds of claim 3, which consists in reacting 4,4'-diaminodiphenyl sulphone with at least two molecular proportions of an inner anhydride of a dicarboxylic acid, which is represented by the formula:

in which R is a divalent hydrocarbon radical having more than one carbon atom.

10. The process of preparing succinic acid derivatives of 4,4' - diaminodiphenyl sulphone, which consists in reacting 4,4'-diaminodiphenyl sulphone with succinic anhydride.

11. The process of preparing maleic acid derivatives of 4,4' - diaminodiphenyl sulphone, which consists in reacting 4,4'-diaminodiphenyl sulphone with maleic anhydride.

12. The process of preparing phthalic acid derivatives of 4,4'-diaminodiphenyl sulphone, which consists in reacting 4,4'-diaminodiphenyl sulphone with phthalic anhydride.

MORRIS S. KHARASCH.
OTTO REINMUTH.